United States Patent [19]

Nakata et al.

[11] Patent Number: 4,617,565
[45] Date of Patent: Oct. 14, 1986

[54] METHOD AND DEVICE FOR DATA COMMUNICATION

[75] Inventors: Yukio Nakata, Kawasaki; Kaoru Suda, Kitaadachi; Osamu Shiotsu, Asaka; Motoyoshi Morito, Iruma, all of Japan

[73] Assignees: Yagi Antenna Co., Ltd.; Hitachi, Ltd., both of Tokyo, Japan

[21] Appl. No.: 538,509

[22] Filed: Oct. 3, 1983

[30] Foreign Application Priority Data

Oct. 8, 1982 [JP] Japan ................ 57-176298

[51] Int. Cl.[4] .................. H04Q 9/00; H04B 9/00
[52] U.S. Cl. ................... 340/825.5; 455/606
[58] Field of Search .............. 340/825.5; 371/55, 61; 370/60, 77, 85, 90, 4; 455/603, 606

[56] References Cited

U.S. PATENT DOCUMENTS

| | | | |
|---|---|---|---|
| 4,040,014 | 8/1977 | Gehrking | 340/825.5 |
| 4,045,774 | 8/1977 | Morrison | 340/825.5 |
| 4,314,164 | 2/1982 | Tin et al. | 340/825.5 |
| 4,422,179 | 12/1983 | Albanese | 455/606 |

*Primary Examiner*—Donald J. Yusko
*Attorney, Agent, or Firm*—Antonelli, Terry & Wands

[57] ABSTRACT

In this data communication system, data communication is conducted through transmission lines between a plurality of stations. At each station, the presence of data to be sent is detected, the length of the detected data is measured, and that that station is disconnected from the transmission lines when the length of data exceeds a predetermined value, to inhibit the sending of data from that station.

3 Claims, 5 Drawing Figures

METHOD AND DEVICE FOR DATA COMMUNICATION

BACKGROUND OF THE INVENTION

1. Field of the Invention

The present invention relates to a system for conducting communication between two stations, such as a master station and a slave station, by making use of the technique of optical space propagation, and more particularly to a data communication system which inhibits any communication with a device such as a runaway terminal.

2. Description of the Prior Art

FIG. 1 shows the construction of a communication system according to the prior art. This communication system is of the type in which the communication is conducted either between a master station 101 and one of slave stations 102 to 104, or between the slave stations 102 to 104 through the master station 101, by means of optical beams 105 to 107. It is assumed that the slave station 104, for example, runs away during communication with the master station 101 so that it continues the data communication without stopping. In this case, the master station 101 or the slave stations 102 and 103 are unable to conduct any data communication because of the obstruction of the data being sent from the slave station 104.

SUMMARY OF THE INVENTION

The major object of the present invention is to provide a data communication system in which transmission by a runaway station is inhibited without fail by the hardware of that runaway station, so that no hindrance is provided to communication between other stations.

In order to achieve this object, the present invention is characterized by a system in which mutual communication is conducted between at least two stations, and in which the length of data sent from a station is detected so that it can be judged that the station is running away when the length of the data detected exceeds a predetermined value, and the transmission of such a station is inhibited.

DESCRIPTION OF THE PREFERRED EMBODIMENT

The present invention will be described in detail below in connection with an embodiment thereof, with reference to the accompanying drawings.

Figure 1:
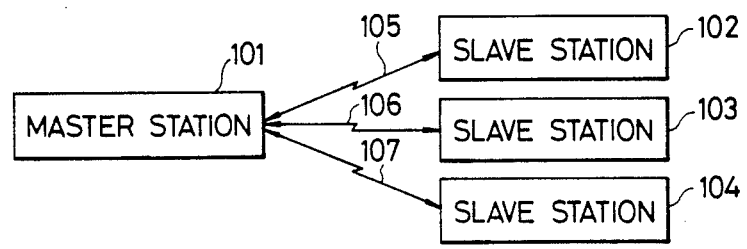
FIG. 1 is a diagram of the construction of a data communication system according to the prior art.
Figure 2:
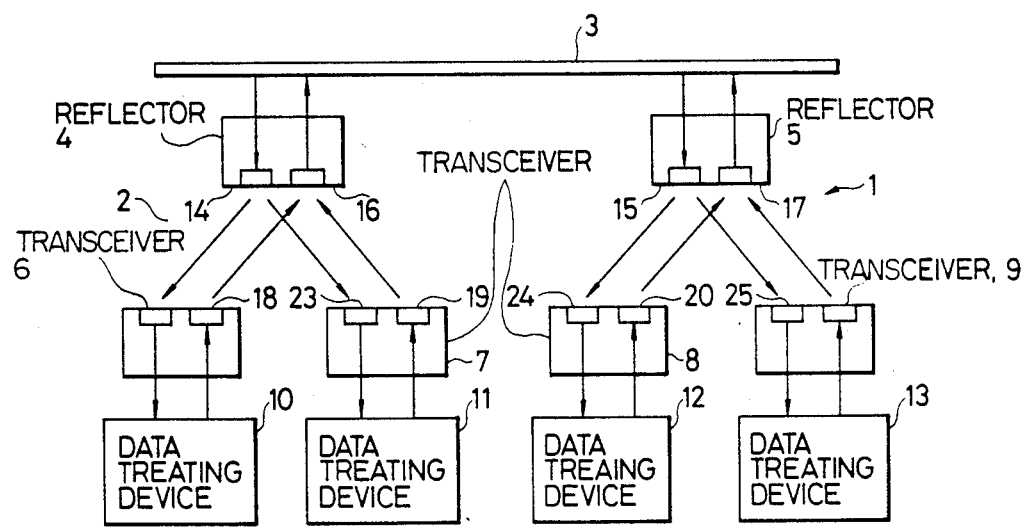
FIG. 2 is a diagram of the construction of one embodiment realizing the data communication system according to the present invention.

FIG. 2 shows an example of the construction of the communication system according to the present invention, in which data communication is conducted between devices such as in-house terminals and a computer.

As shown, two compartments 1 and 2 are connected by a coaxial cable 3 which connects through T-branches to two reflectors 4 and 5 provided at high positions of the compartments 1 and 2, respectively.

In low positions within the compartments 1 and 2, transceivers 6 and 7, and 8 and 9 are provided opposite to the reflectors 4 and 5, respectively, and are connected to devices 10, 11, 12, and 13 which are terminals, such as display terminals or computers.

The transceiver 6 and the device 10, the transceiver 7 and the device 11, the transceiver 8 and the device 12, and the transceiver 9 and the device 13 each constitute a slave station, whereas the reflectors 4 and 5 each constitute a master station. The slave stations are movable.

The reflectors 4 and 5 are equipped with light-emitting diodes 14 and 15 and photodiodes 16 and 17, respectively, and the transceivers 6 to 9 are equipped with light-emitting diodes 18 to 21 and photodiodes 22 to 25, respectively.

In the construction thus far described, the transceivers 6 to 9 receive and send data from the corresponding devices 10 to 13, modulate the intensity of infrared light emitted by the light-emitting diodes 18 to 21, and focus and emit the infrared light to the corresponding reflectors 4 and 5.

The light-emitting diodes 18 to 21 emit infrared light only when data is sent from the devices 10 to 13.

The infrared light emitted from the transceivers 6 to 9 is received by the photodiodes 16 and 17 of the reflectors 4 and 5, which convert it into electrical signal data, and send the converted data to the coaxial cable 3. The data thus sent to the coaxial cable 3 is transmitted to all the reflectors connected to the coaxial cable 3, including the reflector which has sent that data.

When the reflectors 4 and 5 receive data from the coaxial cable 3, they modulate the intensity of the infrared light emitted from the light-emitting diodes 14 and 15 using the received data, and diffuse and emit the intensity-modulated infrared light to all the transceivers 6 to 9 in the compartments so as to cover them all. The infrared light emitted from the reflectors 4 and 5 is received by the photodiodes 22 to 25 of the transceivers 6 to 9 and is sent to the devices 10 to 13 after being converted into electrical signal data.

As a result, when data is sent from a device such as the terminal of a certain compartment, the data is received not only by all the devices of the other compartment, but also by the other device of the same compartment.

Incidentally, the reflectors 4 and 5 are constructed so as to diffuse and emit infrared light within such a range that the infrared light can be received simultaneously by all the terminals provided in the corresponding compartments, whereas the transceivers 6 to 9 emit focused infrared light so that it can be received by the corresponding reflectors 4 and 5.

Figure 3:
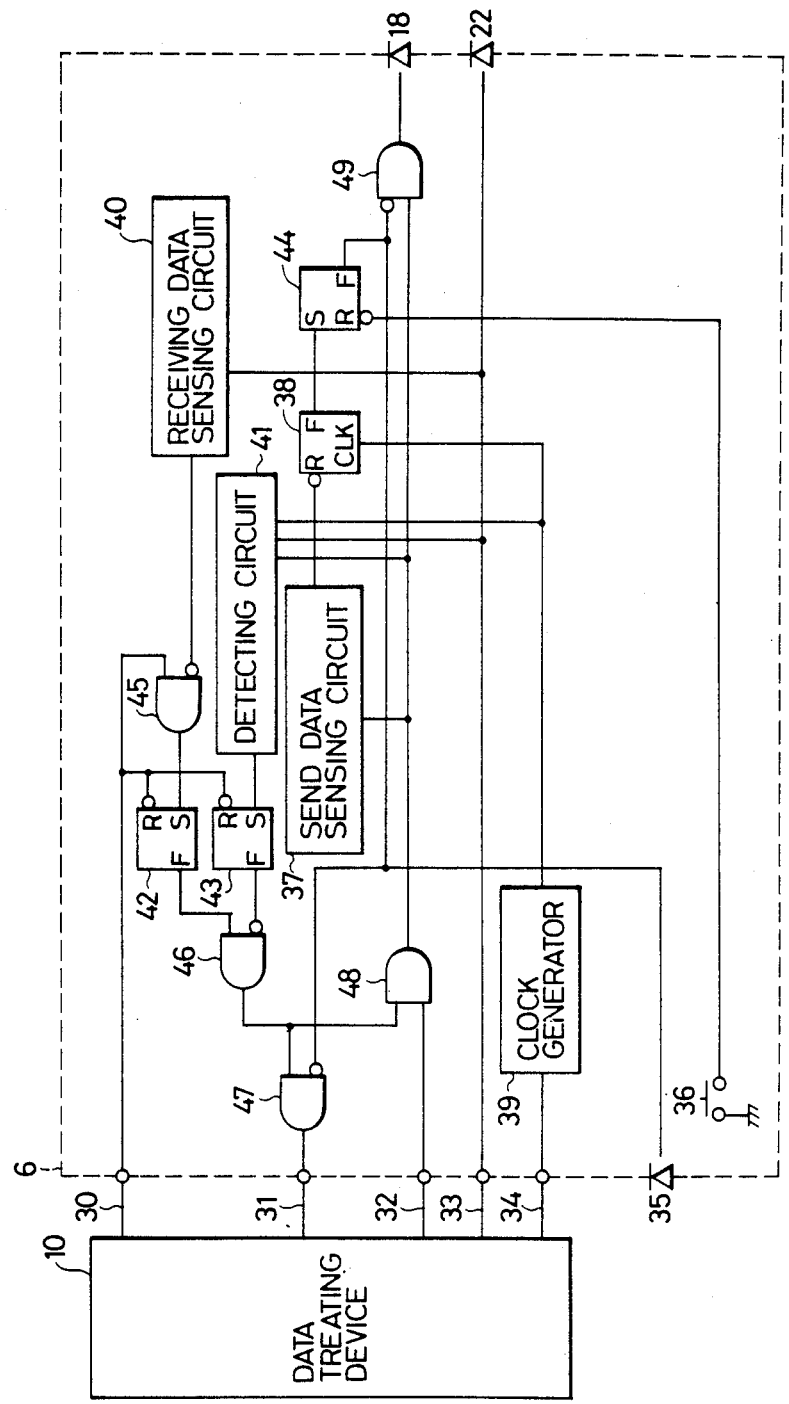
FIG. 3 is a circuit diagram of one embodiment of the transceiver portion of FIG. 2.

FIG. 3 shows the construction of one example of the transceiver of a slave station of FIG. 2, which includes a device for realizing the disconnection of a runaway terminal in accordance with the present invention.

In FIG. 3, reference numeral 30 indicates a signal line for a request-to-send signal; numeral 31 a signal line for a clear-to-send signal; numeral 32 a signal line for sending data; numeral 33 a signal line for receiving data; numeral 34 a signal line for a send clock; numeral 35 an indication lamp for indicating the occurrence of runaway; numeral 36 a switch for resetting a send inhibited state when runaway is detected; numeral 37 a send data-sensing circuit for judging whether or not that station is sending; numeral 38 a data length counter for counting the length of the data being sent; numeral 39 a clock generator for generating a clock signal; numeral 40 a received data-sensing circuit for judging whether or not another transceiver is sending; numeral 41 a detection circuit for detecting any inconsistency between sent data and received data; numerals 42 to 44 flip-flops; and numerals 45 to 49 AND gates.

With reference to FIG. 3, the description is first directed to the interface signals 30 to 34 between the device 10 and the transceiver 6.

When the device 10 intends to send data, the request-to-send signal of the signal line 30 is set at 1 (this will be called "on" hereinafter). In the transceiver 6, the clear-to-send signal of the signal line 31 is turned on when the request-to-send signal from the device 10 is on and when data can be sent, this condition will be described in detail later.

In the device 10, the data being sent (i.e., a series of 1 and 0 bits, synchronized with the clock signals on the signal line 34, is sent over the signal line 32 while the clear-to-send signal is on. In the transceiver 6, the intensity of the light emitted from the light-emitting diode 18 is modulated by the data being sent. Data received (i.e., a series of 1 and 0 bits) from the reflector 4 is received by the photodiode is 22, sent over the signal line 33, and is sent as received data to the device 10.

The timing clock signal for sending data is generated by the clock generator in the transceiver 6, and is sent to the device 10 over the signal line 34.

The operations of sending and receiving data between the devices 10 to 13 will be described in detail below, taking the example of sending data from the device 10 to the device 12.

The transceiver 6 lowers the output of the data-sensing circuit 40 to 0 (this will be called "off" hereinafter) when there is no output from the photodiode 22 for the received data-sensing circuit 40, in other words when the other transceivers are not sending. When the photodiode 22 is outputting, namely, when another transceiver is sending, the transceiver 6 turns on the output from the data-sensing circuit 40. In the device 10, on the other hand, the request-to-send signal on the signal line 30 is turned on before the data is sent.

The AND gate 45 in the transceiver 6 is opened to set the flip-flop 42 if the request-to-send signal is on and the output from the datasensing circuit 40 is off. As a result, the AND gate 46 and subsequently the AND gate 47 are opened to turn on the clear-to-send signal on the signal line 31.

Once the clear-to-send signal has been turned on by the flip-flop 42, even when loop data, which is prepared by reflecting data sent to the transceiver 6 from the reflector 4, is received by the photodiode 22 so that the output of the data-sensing circuit 40 is turned on, the clear-to-send signal remains on until the request-to-send signal is turned off, or until an inconsistency is detected by the detection circuit 41, a condition that will be described later.

In response to the on signal of the flip-flop 42, the clear-to-send signal is turned on, and the AND gate 48 and subsequently the AND gate 49 are opened to make the light-emitting diode 18 emit infrared light in accordance with the send data on the signal line 32.

If the output from the data-sensing circuit 40 is on, even though the request-to-send signal is on, the AND gate 45 is closed so that it does not turn on the clear-to send signal, and the device 10 does not send the data but waits, while the request-to-send signal is on, until the clear-to-send signal is turned on. If the output from the data-sensing circuit 40 is then turned off, the flip-flop 42 is set to turn on the clear-to-send signal so that the device 10 starts is send. As a result, the intensity of the light from the light-emitting diode 18 is modulated by the data being sent from the device 10, and the modulated light is sent to the reflector 4.

When the device 10 completes its sending of data, the request-to-send signal is turned off. As a result, the flip-flop 42 is reset to turn off the clear-to-send signal and stop the emission of the light-emitting diode 18.

While the clear-to-send signal is on, the transceiver 6 sends the data received from the device 10 to the reflector 4 through the light-emitting diode 18.

The reflector 4 receives the data emitted from the transceiver 6 via its photodiode 16, converts it into an electrical signal, and sends this signal to the coaxial cable 3. This data reaches the reflector 5 through the coaxial cable 3 and is sent to the transceivers 8 and 9 facing the reflector 5 by the light-emitting diodes of that reflector 5, and also to the transceivers 6 and 7 facing the reflector 4.

The transceiver receives the loop data looped from the reflector 4 acting as the master station via it photodiodes 22, and feeds its to the detection circuit 41.

The detection circuit 41 compares the sent data and the received data for each bit, and its output is turned on when an inconsistency is detected, and off when no inconsistency is detected.

As a result, the flip-flop 43 is set when an inconsistency between the sent data and the received data is detected, and then the AND gates 46 and 47 are closed to turn off the clear-to-send signal. The closing of the AND gate 46 also closes the AND gate 48 to stop the sending of data. The output of the flip-flop 43 may be set while the request-to-send signal is on, and is reset when the request-to-send signal is turned off.

If the device 10 starts to send data when the clear-to-send signal on the signal line 31 is on, the first data signal which passes through the AND gate 48 is sensed by the send data-sensing circuit 37 and the output of the send data-sensing circuit 37 is turned on to start the data length counter 38. This data length counter 38 counts the length of the sent data by counting the clock signal output from the clock generator 39, and judges that the device is running away when the count value exceeds a predetermined number, to turn on an output from the data length counter 38. When the output from the data length counter is on, the flip-flop 44 is set to close the AND gate 49 to stop the emission from the light-emitting diode 18, and simultaneously close the AND gate 47 to turn off the clear-to-send signal on the signal line 31. The indication lamp 35 is also turned on to indicate the occurrence of runaway. Once runaway occurs, the transceiver 6 is in a state in which it cannot send data, but this state can be released by the resetting switch 36.

If the sending of data ends before the count value of counter 38 reaches the predetermined number, the output of the send data-sensing circuit 37 is turned off, and the counter 38 is reset before its output is turned on, so that the flip-flop 44 is not reset but is held in a state in which the sending of data is enabled.

Figure 4:
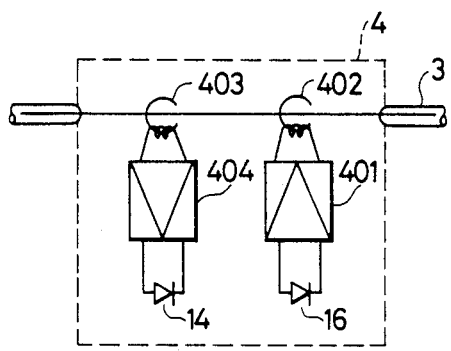
FIG. 4 is a circuit diagram of one embodiment of the reflector portion of FIG. 2.

FIG. 4 shows a concrete example of the construction of the reflectors 4 and 5 and constituting the master stations of FIG. 2, using the reflector 4 as an example.

As shown in the drawing, the light emitted from one of the facing transceivers 6 and 7 is received and converted into an electrical signal by the photodiode 16. The electrical signal is then amplified by an amplifier 401 and is sent to the coaxial cable 3 through a coupling transformer 402. On the other hand, any signal on the coaxial cable 3 is received through a coupling transformer 403 by an amplifier 404 in which the signal is amplified. The amplified signal is then converted by the light-emitting diode 14 into light which is emitted to the facing transceivers 6 and 7.

In short, the reflector 4 receives data sent from the facing transceivers, sends that data to other reflectors, also sends the data as loop data even to the transceiver which sent the data.

Figure 5:
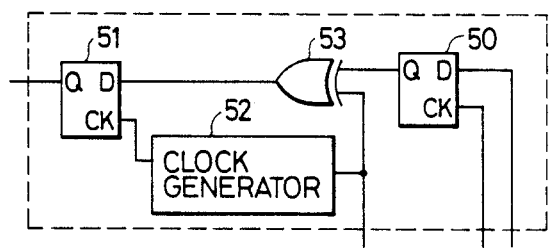
FIG. 5 is a circuit diagram of a specific example of the construction of the detection circuit of FIG. 3.

FIG. 5 shows a concrete example of the construction of the detection circuit 41 of FIG. 3. Reference numerals 50 and 51 indicate flip-flops; numeral 52 a clock generator for generating a reception clock; and numeral 53 an exclusive AND circuit. A D terminal of the flip-flop receives sent data and a CK terminal receives the sending clock signal, whereas the circuit 53 and the generator 52 receive the received data. The generator 52 generates reception sampling clock pulses at the central point of the 0 and 1 bits of the received data, from the beginning of the point at which a 0 bit changes to a 1 bit.

The action of the D-type flip-flop 50 ensures that the sent data sampled by the second clock signal is held for only a one-bit period. The exclusive logical sum of the output of the flip-flop 50 and the received data is taken by the circuit 53 and is sampled by the reception clock from the generator 52 by the D-type flip-flop 51 so that the output of this flip-flop 51 is turned on when the sent and received data are inconsistent.

The description of the embodiment of FIG. 2, incidentally, concerns an example in which the communication between the reflectors and the transceivers is conducted by the use of infrared light. The present invention should not be limited thereto, but can be put into practice by the use of other optical space propagation means.

Moreover, the number of transceivers facing each reflector should not be limited to that shown, but can be any number so long as it is at least one.

This embodiment is directed to an example in which two compartments are coupled by means of a coaxial cable. However, different places within the same compartment can be coupled by means of the coaxial cable. This coaxial cable can be replaced by a transmission path formed of optical fibers for transmitting optical signals unchanged.

Furthermore, the two or more reflectors are not coupled by means of a transmission path such as the coaxial cable, but data communication between the devices such as the terminals of this embodiment may be conducted by means of a single reflector.

According to the embodiment of the present invention described above, when data from a device such as a runaway terminal is being sent by a transceiver, the sending of more than a predetermined number of bits of data is inhibited. As a result, even if one device runs away, it is possible for other stations to conduct communication.

Moreover, even when data communication is inhibited not by the runaway of a device, but by a malfunction in the signal line control circuit, the length of the data sent is monitored to inhibit the sending of more than the predetermined number of bits of data. As a result, it is possible for other stations to conduct communication.

Thanks to the realization of the detection of the occurrence of a runaway and the disconnection of the device by the use of hardware, moreover, a runaway terminal can be disconnected without fail.

The embodiment of the present invention described above is directed to a system equipped with a master station and a plurality of slave stations in which communication is conducted either between the master station and the slave stations, or between slave stations through the master station. However, the present invention can naturally be applied to the case in which communication is conducted either between one master station and one slave station, or between two slave stations.

According to the present invention, as has been described above, not only can a device such as a runaway terminal be disconnected, but the output from its light-emitting diode can be inhibited when the sending of data is inhibited by a malfunction in the signal line control circuit.

By disconnecting the runaway device, moreover it is possible to enable other normal stations to communicate.

What is claimed is:

1. A data communication method for use in a data communication system including a transmission line, and a plurality of stations each having a data device for treating data and a transceiver, whereby data communication is conducted through said transmission line between said stations under control of said stations, wherein the improvement resides in that each transceiver executes the following steps;
   (a) a first step of receiving a request-to-send signal from said data device;
   (b) a second step of sending a clear-to-send signal to said data device in response to said request-to-send signal unless a data signal from any other station is being received by said transceiver;
   (c) a third step of sending the data from said data device to said transmission line during the time said clear-to-send signal is being sent to said data device;
   (d) a fourth step of measuring the duration of said data sending; and
   (e) a fifth step of inhibiting the sending of said data over said transmission line and the sending of said clear-to-send signal to said data device simultaneously when the length of said data sending exceeds a predetermined time length.

2. A data communication system including a transmission line, and a plurality of stations each having a data device for treating data and a transceiver for coupling said data device to said transmission line, whereby data communication is conducted through said transmission line between said stations under control of said stations, wherein the improvement resides in that each transceiver comprises:
   first means for receiving a request-to-send signal which is issued arbitrarily from said data device;
   second means for sending a clear-to-send signal to said data device in answer to said request-to-send signal unless a data signal from any one of the other stations is being received by said transceiver;

third means for sending the data from said data device over said transmission line when said clear-to-send signal is being sent to said data device;

fourth means for detecting whether the data sending carried out by said third means exceeds a predetermined time length; and fifth means for inhibiting both said third means from sending said data over said transmission line and said second means from sending said clear-to-send signal to said data device, when said fourth means detects a time exceeding said predetermined time length.

3. A data communication system comprising:

relay means for receiving and transmitting optical signals, including first light receiving means for receiving light modulated to communicate data and converting said light into an electric signal and first light emitting means for diffusing and radiating light modulatd to communicate data in response to the electrical signal obtained from said first light receiving means; and a plurality of stations each having a data device for transmitting a transmission data signal and receiving a receiving data signal and a transceiver coupled to said data device;

wherein each transceiver comprises;

second light emitting means disposed in optical communication through the air with said relay means for converging and radiating light modulated in accordance with said transmission data signal from said data device;

second light receiving means disposed in optical communication the air with said relay means for receiving the light from said first light emitting means and converting it into an electrical signal representing signal receiving data signal to be received by said data device;

means for receiving a request-to-send signal from said data device;

means for sending a clear-to-send signal to said data device in answer to said request-to-send signal unless said second light receiving means is receiving the light representing a transmission data signal from any one of the other stations;

means for supplying said transmission data signal from said data device to said second light emitting means during when said clear-to-send signal remains on;

means for detecting whether the duration of said data sending exceeds a predetermined time length; and means for inhibiting said transmission data supplying and said clear-to-send signal supplying simultaneously when said time measuring means detects the duration of the data transmission exceeding the predetermined time length.

* * * * *